United States Patent [19]

Bryce et al.

[11] Patent Number: 4,593,184

[45] Date of Patent: Jun. 3, 1986

[54] COUNTERFEIT DETECTION CIRCUIT

[75] Inventors: David Bryce, Morrisville, Pa.; William Sherman, III, Medford, N.J.

[73] Assignee: Brandt, Incorporated, Bensalem, Pa.

[21] Appl. No.: 524,856

[22] Filed: Aug. 19, 1983

[51] Int. Cl.[4] .............................................. G06K 7/08

[52] U.S. Cl. ..................................... 235/449; 235/476

[58] Field of Search ............................... 235/449, 476

[56] References Cited

U.S. PATENT DOCUMENTS 4,114,804 9/1978 Bryce ................................ 235/476

*Primary Examiner*—Harold I. Pitts

*Attorney, Agent, or Firm*—Louis Weinstein

[57] ABSTRACT

A magnetic sensor including a coil for sensing a changing magnetic field developed by paper currency moving past the magnetic sensor. A capacitor forms a tuned circuit with the magnetic sensor coil to pass only those signals lying within a predetermined frequency range. A comparator compares the signals lying within the pass band with a predetermined threshold to determine the presence or absence of genuine currency. The tuned circuit significantly improves the signal to noise ratio of the sensing means and hence, significantly improves the ability to determine the genuineness of the currency. In a second embodiment, the presence of a magnetic field having a field strength above the predetermined threshold is utilized to pass timing pulses for clocking a counter. A decoder gate coupled to the counter indicates the presence of a genuine bill, only after a predetermined count has been reached. A reset circuit is provided for resetting the detecting circuitry immediately after each bill is examined and before examination of the next bill.

15 Claims, 4 Drawing Figures

COUNTERFEIT DETECTION CIRCUIT

FIELD OF THE INVENTION

The present invention relates to a magnetic detection circuits, and more particularly, to a novel magnetic detection circuit for use in examining paper currency for genuineness, in which the magnetic sensor also forms an integral part of a band pass circuit for limiting the signals passed by the band pass circuit for evaluation, significantly improving detection sensitivity.

BACKGROUND OF THE INVENTION

Genuine U.S. Currency has a magnetic property which is capable of being detected by a magnetic sensor. This magnetic property typically is derived from ferromagnetic particles forming one constituent of the ink used to print genuine currency.

Five major variables affecting the signal developed by the sensor utilized to detect the metal property are:

(A) Strength of the magnetic field: Each note is passed through a strong magnetic field during the sensing operation to enhance the signal developed by the sensor.

(B) Speed of the bill: The signal developed by the magnetic sensor is directly proportional to the speed of the paper currency as it passes the sensor. For this reason, detection by the sensor may be erratic when operating at slow speed.

(C) Proximity of note to sensor: If the note is not close enough to the sensor, an insufficient amount of magnetic flux will be sensed by the sensor, causing excessive false stops.

(D) Electrical characteristics: Sensitivity characteristics of the sensor are limited by its design specifications and are of no consequence to field personnel.

(E) Background noise: Motor-brush sparking, transformer windings and other sources of electromagnetic noise can act to mask out the signal produced by a genuine note and thereby reduce the effect of sensitivity of the system.

One sensor employed in the prior art for detecting genuine paper currency is described in U.S. Pat. No. 4,114,804, issued Sept. 19, 1978, and assigned to the assignee of the present invention. The sensor employed therein detects the presence of a magnetic field resulting from the interaction of the ferromagnetic ink and a magnetizing member. However, due to the above-mentioned variables, the sensitivity and hence efficiency, of the detection operation is significantly diminished.

BRIEF DESCRIPTION OF THE INVENTION

The present invention significantly enhances the sensitivity of the detection operation by forming a tuned circuit using the sensor winding as an integral part thereof, so that the sensor winding serves the dual function of detecting changes in magnetic field strength and passing only those signals within a predetermined band pass for evaluation to determine the presence or absence of a genuine bill.

The detection circuit may further be enhanced by detecting the presence of a magnetic field for a minimum predetermined interval during the time which the bill passes the sensor. Upon the simultaneous occurence of the following conditions, namely: that the motor of the document counting and handling device is on, that a bill was detected in the immediately previous examination phase and that a magnetic field is present, a gate is enabled to pass timing pulses to a counter. If the counter reaches a predetermined count before the bill passes the sensor, the bill is identified as a genuine bill. If the predetermined count is not reached, the bill is identified as suspect, a suspect alarm signal is provided, and the counting and handling operation is halted.

The last described embodiment of the present invention makes it possible to adjust detection sensitivity to the point of view of both signal strength and signal persistance, thereby providing an extremely advantageous detection capability.

OBJECTS OF THE INVENTION AND BRIEF DESCRIPTION OF THE FIGURES

It is, therefore, one object of the present invention to provide novel apparatus for determining the genuine status of the paper currency by limiting the frequency range of the signal derived from a magnetic sensor.

Still another object of the present invention is to provide a novel magnetic sensing means for use in determining the status of paper currency and employing a sensor device sensitive to a magnetic field, the sensor device being further utilized as one component of a tuned circuit to limit the frequency range of the signal derived from the sensing device.

Still another object of the present invention is to provide apparatus of the character described hereinabove, and further including means for determining the status of examined paper currency by examining the persistence of the sensor signal passed by the band pass circuit.

The above, as well as other objects of the present invention, will become apparent when reading the accompanying description of the drawings, in which:

FIGS. 1*a* and 1*b*, taken together, constitute a schematic diagram of sensing apparatus embodying the principles of the present invention.

FIGS. 2*a* and 2*b*, taken together, comprise a schematic diagram showing another alternative embodiment of the present invention.

DETAILED DESCRIPTION OF THE INVENTION AND THE PREFERRED EMBODIMENTS THEREOF

Figure 1A:
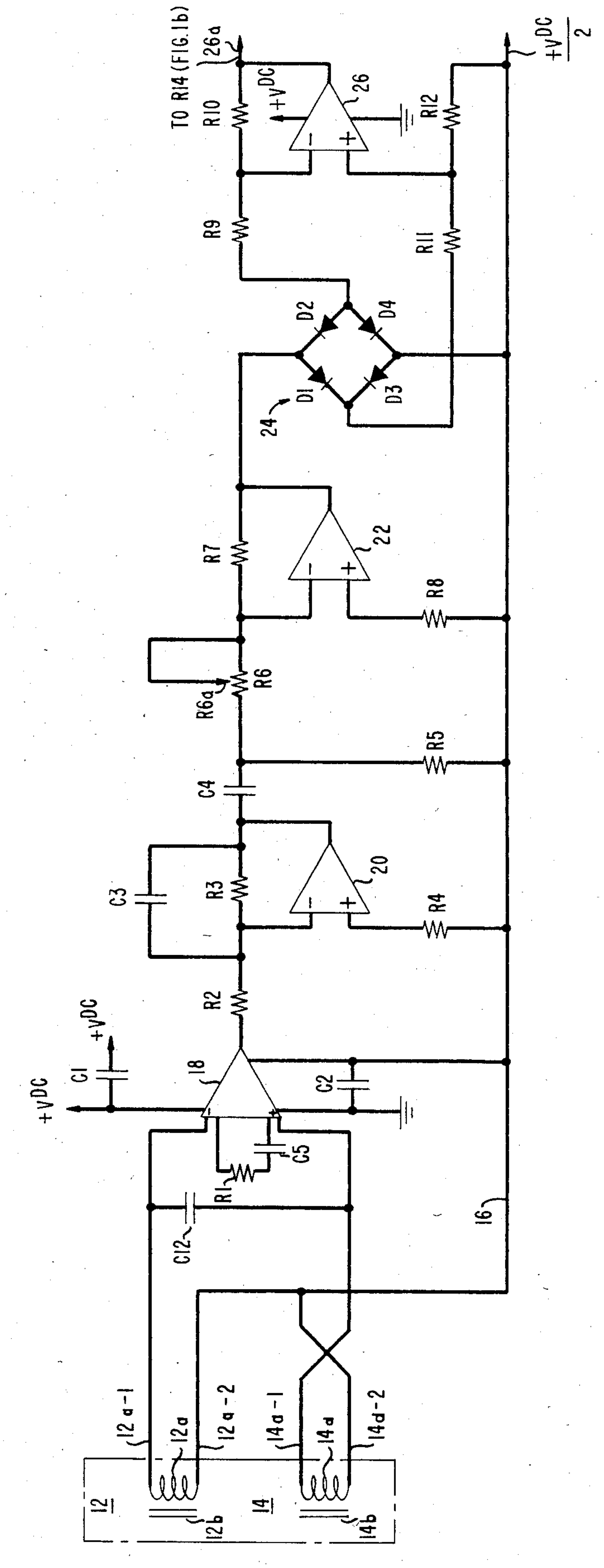
Figure 1B:
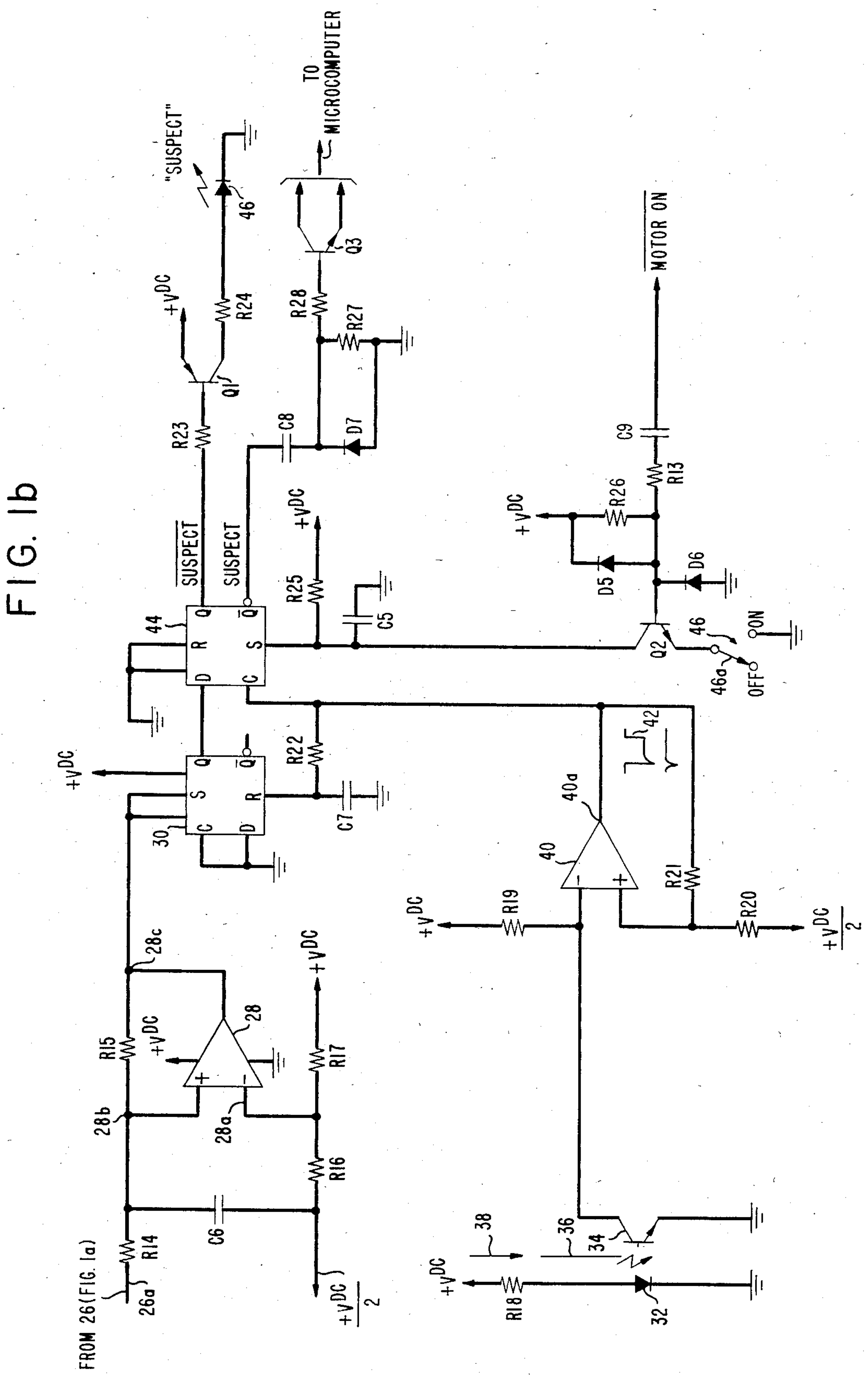

FIGS. 1*a* and 1*b* taken together, show a sensor circuit embodying the principles of the present invention. The sensor circuit may be employed in a document handling and counting apparatus of the type described in U.S. Pat. No. 4,114,804. The circuitry shown in FIG. 1*a* comprises a pair of magnetic heads 12 and 14 each comprised of a winding 12*a*, 14*a* and a magnetizable core 12*b*, 14*b*. Terminals 12*a*-1 and 14*a*-1 of magnetic head assemblies 12 and 14 are respectively coupled across opposing terminals of capacitor C12. Terminals 12*a*-2 and 14*a*-2 are coupled to +VDC/2 supply through common line 16.

Sensors 12 and 14 and capacitor C12 form a tuned circuit which excludes signal frequencies outside of a predetermined "pass band". The signals produced by paper currency lie within the "pass band", and are amplified by a first amplification stage 18.

Further amplification is provided by additional amplification stages 20 and 22 connected in cascade with amplification stage 18. The gain of amplification stage 20 is determined by the ratio of resistors R2 and R3. The gain of amplification stage 22 is determined by the ratio of resistors R6 and R7. The gain of amplifier stage 22, is adjustable and is set by the resistor R6, which is a potentiometer having adjustable arm R6*a*. The gain of amplification stage 22 is preferably set, so that the no-signal noise level output of the amplification stage 22 is a fraction of one volt.

The output of amplification stage 22 is supplied to bridge rectifier 24, comprised of diodes D1 through D4. The positive and negative signal halves of bridge 24 are routed to opposing inputs of subtractor-amplifier 26. Positive-going signals are amplified with a gain of significant magnitude. Negative-going signals are inverted and amplified with the same gain. These two resulting signals are summed and appear at the output 26*a* of amplifier 26.

Considering FIG. 1*b*, the output 26*a* of subtractor-amplifier 26 is applied to an RC filter, including resistor R14 and capacitor C6. The output of RC filter is applied to comparator 28. The tuned circuit is preferably tuned to a center frequency of the order of 1 kHz. The roll-off of the RC filter circuit is of the order of 1.5 kHz. A filtered signal voltage greater than a threshold determined by the voltage divider circuit comprised of resistors R16 and R17, establishes a threshold level at the inverting input terminal 28*a* of comparator 28. A filtered signal voltage applied to input 28*b* and which is greater than the aforementioned threshold develops a "high" at output 28*c*. Conversely, a voltage less than the threshold maintains a "low" output at 28*c*.

A "high" level supplied to the SET input S of bistable flip-flop 30 sets this flip-flop, causing the Q output to go "high" and to remain high until bistable flip-flop 30 is reset by a "high" applied to its reset input R.

Bistable flip-flop 30 is reset by preview signal circuitry comprised of an LED light source 32 and a phototransistor 34, which is positioned to be in saturation due to the light impinging thereon to LED 32 when no note is passing the magnetic sensor, LED 32 and phototransistor 34 being positioned on opposite sides of the path of movement of a piece of paper currency 36. The direction of movement of bills is shown by arrow 38.

Alternatively, the source 32 and phototransistor 34 may be placed on the same side of the feed path, and a reflective member may be placed on the other side of the feed path. Light normally directed toward the reflective member, which reflects the light toward the phototransistor, except when a sheet moves therefrom.

The collector of phototransistor 34 is coupled to the inverting input of comparator 40. A voltage divider circuit comprised of resistors R20 and R21 establish a predetermined threshold level at the non-inverting input of comparator 40. When phototransistor 34 is in saturation, a "low" level is applied to the inverting input of comparator 40 causing output 40*a* to go "high". As a note 36 passes, the light path is blocked, causing the inverting input of comparator to go "high". The comparator output 40*a* switches to the "low" condition, also significantly dropping the threshold level applied to the non-inverting input of comparator 40. As the note passes beyond the magnetic sensors 12, 14, the light path is uncovered to turn phototransistor 34 on, causing the voltage at the inverting input of comparator 40 to exceed the lower threshold level and drive the output 40 of comparator 40 "high".

Summarizing, the preview signal produced at output 40*a*, the level is "high" when no note is present, is "low" during the passage of a note (i.e., during the note sensing time), and has a "low-to-high" transition at the trailing edge of each note. This is shown by waveform 42.

The preview signal, represented by waveform 42 is applied to the clock input C of bistable flip-flop 44 and, after a time delay of at least several microseconds, determined by a delay circuit comprised of R22 and C7, is applied to the reset input R of bistable flip-flop 30. If a genuine note passed magnetic sensors 12, 14, the Q output of transistor 30 is set "high" prior the time the clock input C of bistable flip-flop 44 goes "high". At this transition, the level at the D input of bistable flip-flop 44 is transferred to the Q output, causing the Q output to go high and the $\overline{Q}$ to go low. This is the SET condition of bistable flip-flop 44 and indicates that sufficient magnetic flux is detected to classify the examined note as genuine In the event that insufficient magnetic flux is detected, output 28*c* does not go "high" (i.e., remains "low"). Therefore, it remains "low" from the last "no-note" high at output 40*a* of comparator 40. The end-of-note transition at clock input C of bistable flip-flop 44 clocks a "low" condition to its Q output and a "high" condition to its $\overline{Q}$ output. The "low" condition at its Q output, turns transistor Q1 on, and causes the SUSPECT indicator, LED 46 to be illuminated. The low-to-high transition at the $\overline{Q}$ output of bistable flip-flop 44 is passed through capacitor C8 and resistor R28, turning transistor Q3 on for a predetermined number of milliseconds.

During this time, a microprocessor (not shown) provided as part of the document handling and counting apparatus sends a pulse to a STOP switch in a parallel connection with transistor Q3, looking for a switch closure. With transistor Q3 turned "on", the switch appears to be closed, causing the microprocessor to stop the document handling and counting machine. Conversely, when Q3 is "off", the document handling and counting machine continues to operate.

Operation of the document handling and counting machine is continued by depressing the START switch. When the START switch is depressed, the microprocessor causes the motor to run by bringing the MOTOR-ON line "low". The high-to-low transition turns transistor Q2 off, causing its collector to go "high" and thereby setting bistable flip-flop 44 by applying a "high" level to its SET input S, driving the Q and $\overline{Q}$ outputs "high" and "low", respectively, indicating the NO SUSPECT condition.

The counterfeit detection circuitry may be disabled by opening the normally closed switch arm 46*a* of switch 46, preventing the occurrence of an abrupt positive to negative transition at the SET input S of bistable flip-flop 44, thereby enabling operation of the document handling and counting apparatus without performing a counterfeit detection operation.

Figure 2A:
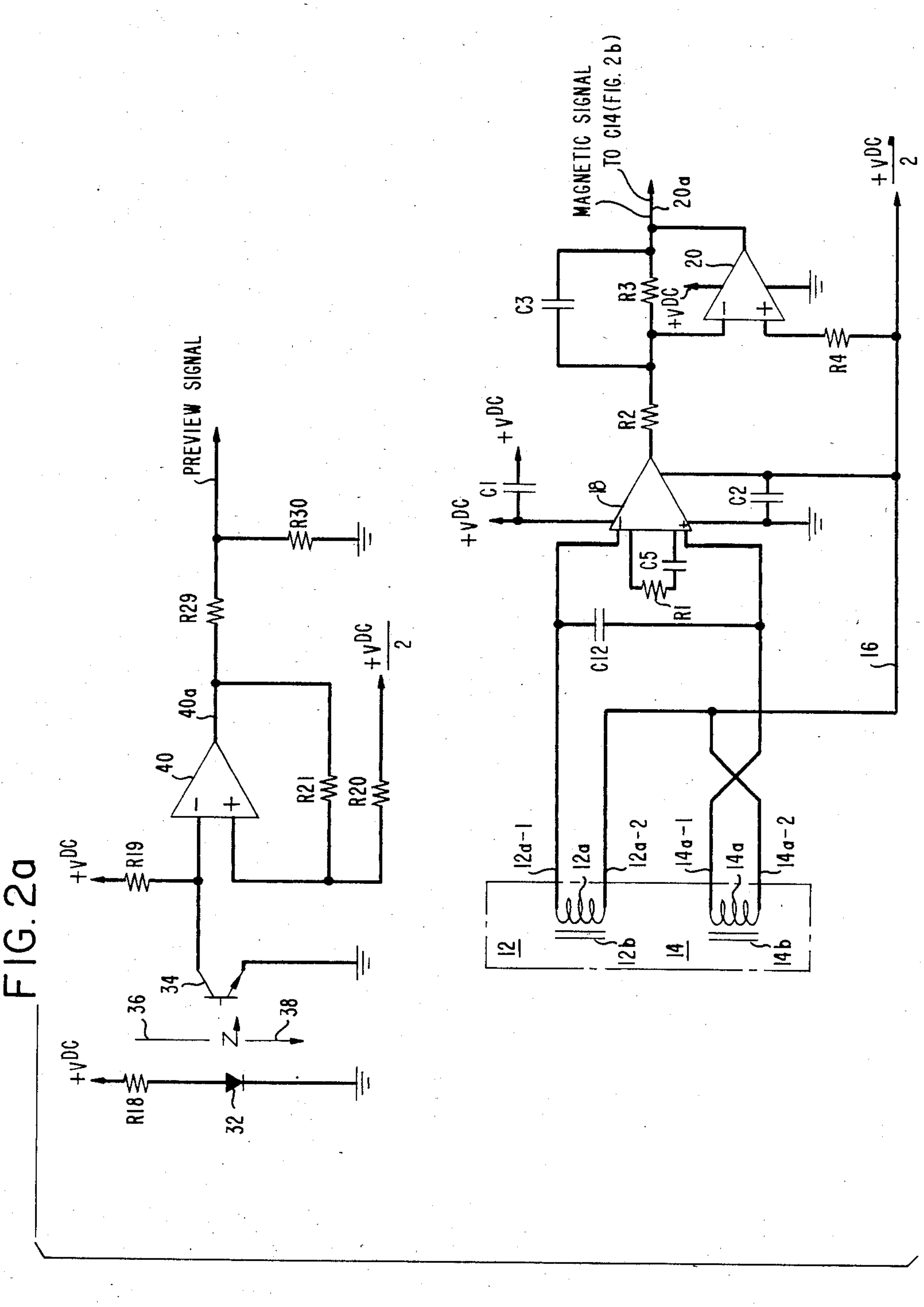
Figure 2B:
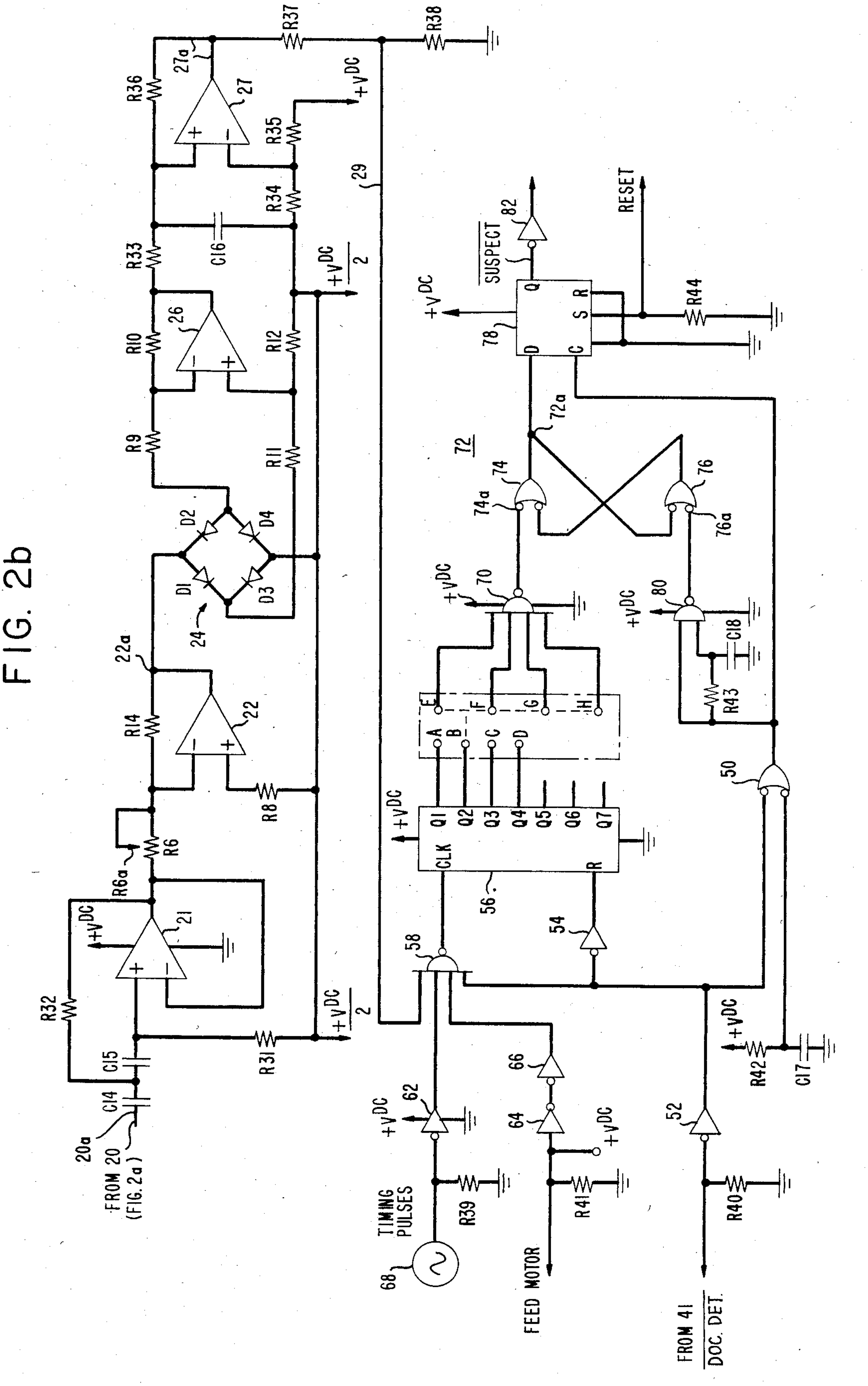

In another alternative embodiment of the present invention, shown in FIGS. 2*a* and 2*b*, and wherein like elements as between FIGS. 1*a*–1*b* and 2*a*–2*b* are designated by like numerals, FIG. 2*a* shows the sensors 12 and 14 coupled to form a tuned circuit with capacitor C12. Only one additional amplification stage comprised of amplifier 20 is provided in the embodiment of FIGS. 2*a* and 2*b*.

Comparator 40 is shown as comparing the output of phototransistor 34 for providing the preview signal described hereinabove, at output 40*a*.

As shown in FIG. 2*b*, the magnetic signal appearing at the output 20*a* of amplifier stage 20 is applied to amplifier stages 21 and 22, stage 22 being substantially the same as that described in connection with FIG. 1*a*. The output 22*a* of stage 22 is full wave rectified by bridge 24, comprised of diodes D1 through D4. Stage 26 amplifies positive-going signal swings and inverts and amplifies negative-going signal swings. Stage 27 is similar to stage 28, shown in FIG. 1*b*, which was described hereinabove.

The output 29 of stage 27 is applied to one input of NAND gate 58. The preview signal is coupled to a second input of NAND gate 58 through inverter 52. The output of inverter 52 is further coupled through inverter 54 to the reset input R of multi-stage, solid-state electronic counter 56 and is also coupled to one input of NOR gate 50.

In one embodiment, a third input of NAND gate 58 is coupled to receive a FEED signal, indicating that the drive motor of the document handling and counting apparatus is on, through inverters 64 and 66 connected in cascade between the feed signal and the third input of NAND gate 58.

Timing pulses from a clock pulse source 68, which preferably is derived from the microprocessor (not shown) are applied to the remaining input of NAND gate 58 through inverter 62.

When no bill is passing between LED 32 and phototransistor 34 (see FIG. 2*a*), the reset input R of counter 56 is "high", preventing counter 56 from being incremented. As soon as a bill is present, this signal level drops "low".

NAND gate 58 is enabled when a bill is present (output 40*a*), when a magnetic signal (output 20*a*) is present, and when the motor of the document handling and counting apparatus is on (FEED signal), to pass timing pulses to the clock input CLK of counter 56. Counter 56 is enabled to begin counting timing pulses due to the "low" condition at its reset input R.

NAND gate 70 has its inputs wired to selected outputs Q1 through Q7 of counter 56, and developes a low output, when all of its inputs are high. This condition is used to switch bistable flip-flop 72, comprised of cross-coupled NOR gates 74 and 76, causing its output 72*a* go high when the output of NAND gate 70 is low, to apply a high level to the D input of bistable flip-flop 78.

As was mentioned hereinabove, the preview signal is coupled through the output of inverter 52 to one input of NOR gate 50. The output of NOR gate 50 is coupled to gate 80, which functions as an inverter, and to the clock input C of bistable flip-flop 78. As soon as the trailing edge of a bill passes phototransistor 34 (see FIG. 2*a*) bistable flip-flop 78 is clocked to pass the level at the D input of flip-flop 78 to its Q output. Inverter 80 is coupled to input 76*a* and inverts the output of gate 50 after a predetermined delay, determined by delay circuit R43-C18, to reset the bistable stage 72.

A "high" Q output of bistable flip-flop 78 is inverted at inverter 82 to indicate the presence of a genuine bill.

In the event that the output of bistable stage 72 is "low" at the time that the trailing edge of a bill is detected by phototransistor 34, the "low" level at the D input of bistable flip-flop 78 is passed to the Q output. This condition is inverted at 82, to develop a SUSPECT signal.

Thus, the circuitry of FIGS. 2*a* and 2*b* provides a suspect signal when the count developed by counter 56 fails to reach a predetermined count. Conversely, when the predetermined count is achieved prior to or upon detection of the trailing edge of the bill being examined, a genuine condition will be detected. In one example, all inputs of gate 70 may be coupled to the Q2 output of counter 56, so that a genuine condition is detected when counter 56 reaches a decimal count of 2. The count required to set the output of gate 70 "low" may be adjusted to suit the needs of the particular type of bill being examined.

The timing pulses applied to one input of NAND gate 58 through inverter 62 are preferably developed at a 2 kHz rate.

The feed motor-on condition (FEED) may be omitted as a condition to be detected by NAND gate 58, for purposes of clocking counter 56, if desired.

The upper and lower frequency limits of the pass band for the tuned circuit formed by the windings of sensors 12 and 14 and capacitor C12 are selected to include the frequency of the changing magnetic signal detected by said sensors 12 and 14 which, depending upon the thickness and relative positioning of the engraved lines upon a bill, for example, may vary from bill to bill and from one side of a bill to the other.

The improvement in signal to noise ratio of the detection device, due to the employment of the tuned circuit, is quite significant, leading to a very significant improvement in detection capability.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for detecting the presence of a genuine bill comprising:

magnetic sensor means including coil means positioned adjacent to the path of movement of a bill for generating a signal in the presence of a changing magnetic field created by the moving bill;

capacitance means forming a turned circuit with said coil means for passing signals within a predetermined band pass range in accordance with the impedance value of said coil and said capacitor;

means for amplifying the detected signal;

means for converting the detected signal to a DC level;

comparator means for comparing the converted signal against a predetermined threshold;

first storage means for storing the result of the comparison operation by said comparator means;

second storage means;

bill sensing means having a first output state as the bill is passing said magnetic sensing means and having a second output state when said bill has passed said magnetic sensor means;

said second storage means being responsive to the change of said bill sensing means to said second state for transferring the contents of said first storage means to said second storage means;

delay means responsive to the change of said bill sensing means from said first state to said second state for resetting said first bistable means a predetermined time interval after the contents of said first bistable means has been transferred to said second bistable means.

2. The apparatus of claim 1, further comprising lamp means and means for illuminating said lamp means responsive to said second bistable means storing a suspect condition.

3. The apparatus of claim 1, further comprising means responsive to said second bistable means storing a suspect signal for generating a stop signal for halting the feeding of sheets.

4. The apparatus of claim 1, further comprising means responsive to the halting of the feeding of sheets for resetting said second bistable means.

5. The apparatus of claim 1, wherein said tuned circuit is tuned to pass signals lying in the range of 0.5 to 1.5 kHz.

6. The apparatus of claim 5, wherein said signals lying in the preferred range of 0.9 to 1.1 kHz.

7. The apparatus of claim 1, further comprising:

coincidence gate means;

a source of timing pulses;

said first storage means comprising counter means;

said coincidence gate means responsive to said note sensing means changing to its second state and responsive to said comparator means indicating that the sensor means signal is at least equal to said threshold level for passing timing pulses to the clock input of said counter means.

8. The apparatus of claim 7, further comprising first bistable means;

second coincidence gating means normally in a first output state being coupled to said counter means and responsive to a predetermined count for developing a second output state, the state of said second coincidence gating means being stored in said first bistable means;

second bistable means;

transfer means responsive to said bill sensing means being changed to its second state for transferring the state of said second coincidence gating means stored in said first bistable means to said second bistable means, said transfer means further comprising means for resetting said first bistable means a predetermined time after transferring the contents of said first bistable means to said second bistable means.

9. The apparatus of claim 8, further comprising means for providing a signal indicating that paper currency is being fed, said first mentioned coincidence gating means being further responsive to said last mentioned means for enabling pulses from said timing pulse source to be passed to said counter means when said documents are being fed, in addition to the aforementioned conditions which must be present, to enable passage of timing pulses to said counter means.

10. Means for detecting the presence of a changing magnetic field developed by bills moving along a feed path at predetermined spaced intervals;

sensing means positioned immediately adjacent said feed path and including coil means for generating a signal in the presence of a changing magentic field developed due to the movement of bills past said sensing means;

capacitance means forming a tuned circuit with said coil means forming a band pass circuit for passing signals developed by said sensor means within a predetermined frequency range;

means for converting the signals lying within said band pass range into a DC level;

comparator means for comparing said converted signals against a predetermined threshold for generating a first output when said converted signal is less than said predetermined threshold and for generating a second predetermined output level when said converted signal is equal to a greater than said predetermined threshold, said first output level indicating that said bill is suspect.

11. The apparatus of claim 10, further comprising bill sensing means for generating a first output signal level when a bill is passing a magnetic sensing means and for generating a second output level when a bill passes beyond said magnetic sensing means;

means responsive to generation of said second level by said bill sensing means for generating a suspect signal when the output of said comparator is at said first level and for generating a genuine signal when the output of said comparator is at said second level.

12. The apparatus of claim 11, further comprising means responsive to the presence of a suspect signal to halt the feeding of said paper currency.

13. The apparatus of claim 11 further comprising first storage means for temporarily storing the output of said comparator means.

14. The apparatus of claim 13 further comprising second storage means and transfer means for transferring the state of said first storage means to said second storage means, responsive to the second output level of said bill sensing means.

15. The apparatus of claim 14 further comprising delay means responsive to said transfer means for resetting said first storage means a predetermined time after the contents of the first storage means has been transferred to said second storage means.

* * * * *